J. A. HOUSE.
HOSE-CARRIAGE AND ENGINE.

No. 171,809. Patented Jan. 4, 1876.

WITNESSES
Wm A Skinkle
Wm J. Peyton

INVENTOR
James A House.
By his Attorney
W. D. Baldwin.

UNITED STATES PATENT OFFICE.

JAMES A. HOUSE, OF BRIDGEPORT, CONNECTICUT.

IMPROVEMENT IN HOSE-CARRIAGES AND ENGINES.

Specification forming part of Letters Patent No. 171,809, dated January 4, 1876; application filed December 13, 1875.

*To all whom it may concern:*

Be it known that I, JAMES A. HOUSE, of Bridgeport, in the county of Fairfield and State of Connecticut, have invented certain new and useful Improvements in Hose-Carriages and Engines, of which the following is a specification:

My invention relates to a hose carriage or reel mounted upon wheels, of the class adapted for supporting and moving hose through which fluid passes under pressure, whereby the weight of the hose and the fluid contained therein is supported by the wheels of the carriage. My invention also relates to a novel combination with a carriage of a fire-extinguisher or chemical-engine.

The subject-matter claimed will hereinafter specifically be designated.

Figure 1:
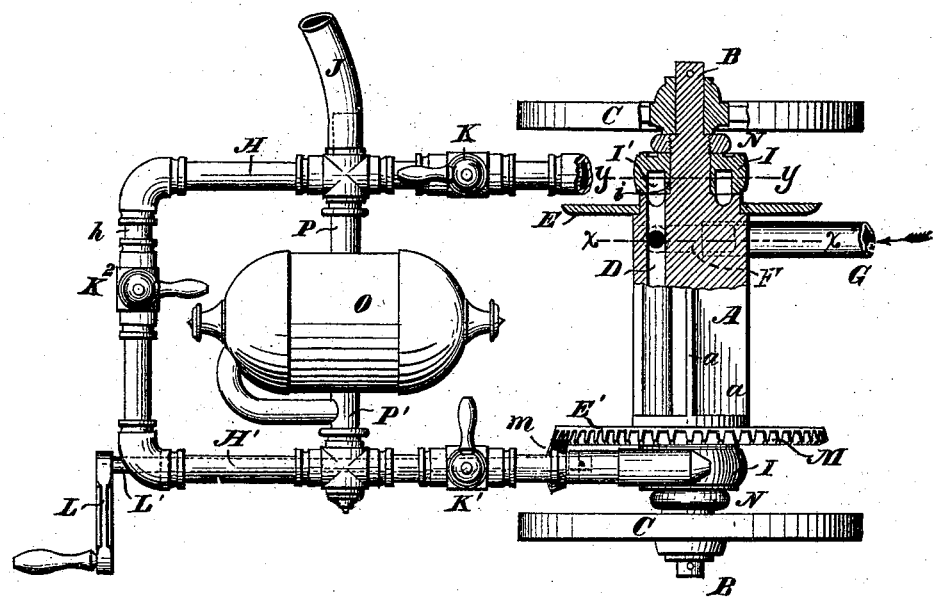
Figure 2:
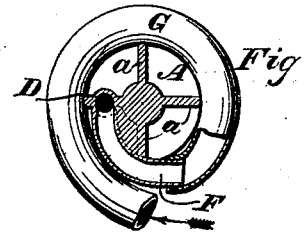
Figure 3:
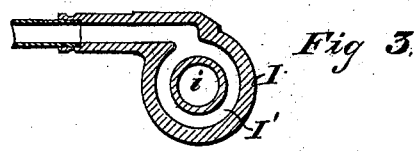

In the accompanying drawings, Figure 1 represents a plan or top view, partly in section, of an apparatus embodying all my improvements in the best way now known to me; Fig. 2, a vertical transverse section through the hose-reel and pipe connecting with the interior thereof, on the line $x\,x$ of Fig. 1; Fig. 3, a similar section on the line $y\,y$ of Fig. 1, showing one of the connections between the draft-handle or propelling-shafts, the axle, and the hose-reel.

A reel, A, preferably composed of metal, and formed with an axle, B, is supported upon wheels C C at its ends. The reel body or frame composes the carriage-body, and is provided with ribs or vanes $a$, and with a longitudinal channel or way, D, shown in this instance as partly formed in one of the ribs. This channel is represented as extending from end to end of the reel or carriage body or frame, continuing beyond the guards or flanges E E', between which the hose to be used is wound upon the reel, and is open at both ends. A hose coupling or attachment, shown as formed of a short curved pipe, F, communicates at one end with the way in the body of the reel, and has the hose G detachably connected to its outer end in any suitable well-known way. The reel is connected at its ends with a tubular frame constituting a draft-handle or shafts, by which the carriage may be pulled or pushed from place to place. This draft-handle is shown as made of a bow or U shape, and composed of two sections, H H', connected by a sliding or other suitable tight joint, at $h$, in its outer or bent end. The inner ends of the handle or hollow draft-frame are formed with perforated sockets or caps I I, provided with annular grooves or ways I' on their inner surfaces, and with bearings $i$, formed by the perforations, to fit around the axle B. When in position, as shown in Fig. 1, the caps fit upon the shouldered portions of the axle, with their inner faces resting water-tight against the ends of the reel-frame, and their recessed ways I' communicating with the reelway or channel D. In this manner water, or other fluid passing through the hose G and interior of the reel, can be conducted by the hollow shafts to a discharge-tube, J, which should consist of a short section of hose fitted to an opening in the shafts in any suitable well-known way, and provided with a branch pipe or discharge-nozzle, to be held in the hand of the person while standing at the end of the propelling handle or shafts. By means of valves or cocks K K¹ K², the water or other fluid may be caused to flow from either end of the reel, and by either side of the handle. If the cock K be closed and the cocks K¹ K² opened, the water passes from the hose through the cocks K¹ K², and escapes through the outlet in the handle, the hose J, and its pipe, while by closing these cocks K¹ K², and opening K, the water passes more directly to the discharge-tube, as will be seen.

To enable the operator to wind the hose upon the reel, as well as aid its unwinding therefrom in case the strain necessary to automatically revolve the carriage is such as to interfere with the free passage of the fluid through the hose, a crank, L, at the end of the handle is connected with a rod, L', mounted in suitable bearings on the handle at one side, and serves to rotate a pinion, $m$, which gears with a large pinion, M, formed with or fastened to the guard E', which moves with the reel. By revolving the crank, the reel is rotated and the hose wound up or layed out, as desired. As the shafts turn independently of the reel and axle, the attendant has thorough control over the apparatus, and by means of the discharge-tube the stream may be thrown in any direction without moving the carriage or rendering necessary any change in the position of the operator. By removing the nuts N, which hold the shaft ends in place, and disconnecting the sections at the joint $h$, the sections may be separated for removal, inspection, or repair.

A fire-annihilator or chemical engine, O, of any of the well-known and approved constructions, is mounted between the sides of the tubular handle, upon a rod or support, P, journaled so as to be capable of turning or rocking in the handle, to mix the chemicals, as is well understood, and so as to be readily separable from the handle or shafts. One end of the supporting-rod P is solid, so as not to communicate with the passage or way in the handle, while the opposite end P' is tubular, and forms a communication between the interior of the cylinder of the engine and the way in the tubular handle. In that class of engines in which the reservoir contains the chemical ingredients ready for use in connection with water, the water passes through the cocks $K^1$ $K^2$, (K being closed,) and mixes with the ingredients from the engine as they escape, in a well-known way, while, if the gases generated are used without the employment of a stream of water, the cock $K^2$ only is opened to lead the chemicals to the discharge-tube.

It is obvious that instead of leading the gases to the discharge-tube J, they might be conducted through the way in the reel-body, and through the hose, either wound thereon or unwound; and water might be similarly conveyed through the handle, reel, and hose from the tube J. It is also obvious that water might be admitted under pressure at the tube J, and pass to the reel-body, and the chemical ingredients also allowed to pass to the way in the reel, where they would mix with the water and be discharged through the hose G.

Where an engine is not combined with the carriage, the section H of the shafts only may be hollow, if desired, and the channel D extend only from the tube F to the hollow section H, and such construction would answer well for watering gardens, wetting streets, &c.; but I prefer the construction shown.

By my improvements it will be seen that the labor incident to, and injurious wear occasioned by, dragging filled hose over the ground is avoided, while the operator has the apparatus under complete control, and may rapidly adjust it for use either as a fire-extinguisher or for delivering a stream of water only.

I claim as of my own invention—

1. The combination, substantially as hereinbefore set forth, of the hose-reel, having a fluid way or channel therein, the hose attachment, communicating with the fluid-way in the reel, and the tubular draft frame or handle, having a fluid-way communicating with that in the reel, whereby the fluid passes from the hose through the reel and handle to the discharge-opening.

2. The combination of the hose-reel, its fluid-way, the pipe for connecting the hose and fluid-way in the reel, the tubular draft-handle, the discharge-tube attached to the handle, and a cock for opening and closing the way leading from the reel to the discharge-tube, these members being constructed and operating substantially as set forth.

3. The combination of the hose-reel, its fluid-way, the pipe for connecting the hose and fluid-way in the reel, the tubular handle having a fluid-way communicating with the opposite ends of the way in the reel, and cocks in the handle, these members being constructed and operating substantially as set forth, whereby the course of the fluid in passing through the handle may be changed.

4. The U-shaped tubular sectional shafts or draft-handle, constructed substantially as set forth, provided with a joint in the outer end, and perforated internally-grooved caps at the inner ends, for the purpose specified.

5. The combination of the frame, the fluid-way therein, the axle, the supporting-wheels, the jointed hollow handle or draft-frame, and the internally-grooved perforated caps on the ends of the handle, these members being constructed and operating substantially as set forth.

6. The combination, substantially as hereinbefore set forth, of the draft-handle, the crank, the gearing, the reel, its axle, and supporting-wheels, for the purpose specified.

7. The combination, substantially as hereinbefore set forth, of the hose-carriage, its tubular draft-frame or handle, the chemical-engine supported by the handle, and having a communication between it and the way in the handle, and the discharge-tube secured to the handle, whereby the contents of the engine may be discharged through the handle and discharge-tube.

8. The combination, substantially as hereinbefore set forth, of the hose-reel, the way thereof, the hose attachment, communicating with the way in the reel, the draft-frame or handle, having a way therein communicating with the way in the reel, the chemical-engine, communicating with the way in the draft-frame or handle, and a cock for opening and closing communication between the reelway and engine.

9. The combination of the hose-reel, the fluid-way thereof, the hose-connecting pipe, the tubular handle, the chemical-engine supported by the handle, the cocks in the handle, and the discharge-tube, these members being constructed and operating substantially as set forth.

In testimony whereof I have hereunto subscribed my name.

JAMES A. HOUSE.

Witnesses:
GEO. H. DIMOND,
F. McGRATH.